United States Patent
Kasuya et al.

(10) Patent No.: US 8,870,386 B2
(45) Date of Patent: Oct. 28, 2014

(54) PROJECTION IMAGE AREA DETECTING DEVICE THAT GENERATES MARKER IMAGES

(75) Inventors: Yuuji Kasuya, Kanagawa (JP); Tadashi Araki, Kanagawa (JP); Keiji Ohmura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 332 days.

(21) Appl. No.: 13/388,315

(22) PCT Filed: Sep. 6, 2010

(86) PCT No.: PCT/JP2010/065676
§ 371 (c)(1),
(2), (4) Date: Feb. 1, 2012

(87) PCT Pub. No.: WO2011/030878
PCT Pub. Date: Mar. 17, 2011

(65) Prior Publication Data
US 2012/0127323 A1 May 24, 2012

(30) Foreign Application Priority Data

Sep. 10, 2009 (JP) ................................. 2009-209460
Jul. 26, 2010 (JP) ................................. 2010-166943

(51) Int. Cl.
*G03B 21/14* (2006.01)
*H04N 9/31* (2006.01)
*G06T 7/00* (2006.01)
*G03B 17/54* (2006.01)
*G03B 21/26* (2006.01)

(52) U.S. Cl.
CPC .............. *G03B 21/26* (2013.01); *H04N 9/3185* (2013.01); *G06T 7/0044* (2013.01); *G06T 2207/30204* (2013.01); *G03B 17/54* (2013.01); *G03B 21/14* (2013.01); *G06T 2207/10016* (2013.01); *G03B 21/147* (2013.01); *H04N 9/3194* (2013.01)

USPC .............................................. 353/69; 348/189

(58) Field of Classification Search
CPC ...... G03B 17/54; G03B 21/14; G03B 21/147; G03B 21/26; H04N 9/3185; H04N 9/3191; H04N 9/3194; G06T 7/0044; G06T 2207/10016; G06T 2207/30204
USPC .................... 353/30–31, 69–70; 348/189–190
See application file for complete search history.

(56) References Cited

U.S. PATENT DOCUMENTS 5,528,263 A * 6/1996 Platzker et al. ............... 345/156
6,808,270 B2 * 10/2004 Nelson et al. .................... 353/69

(Continued)

FOREIGN PATENT DOCUMENTS

EP          1 294 189 A2    3/2003
JP          2002 049093     2/2002

(Continued)

OTHER PUBLICATIONS

International Search Report issued on Nov. 22, 2010 in PCT/JP10/065676 filed on Sep. 6, 2010.

(Continued)

*Primary Examiner* — Tony Ko
*Assistant Examiner* — Jori S Reilly-Diakun
(74) *Attorney, Agent, or Firm* — Oblon, Spivak, McClelland, Maier & Neustadt, L.L.P.

(57) ABSTRACT

A projection image area detecting device includes a projection image area detecting unit configured to detect marker image areas in a photographed image that is obtained by photographing a projection image area including a projection image. The marker image areas include marker images that are used for identifying four corners of the projection image area. The projection image area detecting unit detects the marker image areas by identifying a color included in the marker image areas that continues to change as time passes.

14 Claims, 16 Drawing Sheets

(56) References Cited

U.S. PATENT DOCUMENTS

| | | | |
|---|---|---|---|
| 8,162,487 B2* | 4/2012 | Ofune et al. | 353/70 |
| 8,442,313 B2* | 5/2013 | Kondo et al. | 382/167 |
| 2010/0134702 A1 | 6/2010 | Kondo et al. | |
| 2013/0083298 A1* | 4/2013 | Yoshimura et al. | 353/69 |

FOREIGN PATENT DOCUMENTS

| | | |
|---|---|---|
| JP | 2008 225553 | 9/2008 |
| JP | 2009 184059 | 8/2009 |
| JP | 2011 151764 | 8/2011 |
| WO | WO 2007/149323 A2 | 12/2007 |

OTHER PUBLICATIONS

The Extended European Search Report issued Apr. 7, 2014, in Application No. / Patent No. 10815472.5-1905 / 2476258 PCT/JP2010065676.

* cited by examiner

40

41

42

43

US 8,870,386 B2

PROJECTION IMAGE AREA DETECTING DEVICE THAT GENERATES MARKER IMAGES

TECHNICAL FIELD

The present invention relates to projection image area detecting devices, and more particularly, to a projection image area detecting device for photographing, with a photographing device, an image that has been projected onto a projection object by a projection device, and detecting an area in which the projection image is projected based on the photographed image.

BACKGROUND ART

Conventionally, there is a technology of adding marker images to a projection image for specifying the four corners of the projection image. A projection device projects such a projection image onto a projection object such as a whiteboard. A photographing device photographs the projection image. A detecting device detects, in the photographed image, the areas in which the marker images are projected. Accordingly, projection distortions in the photographed image can be corrected before displaying the image with a remote display device. Furthermore, coordinates that are pointed out on the projection object can be converted into the coordinates of the actual image, and the converted coordinates can be recorded.

FIG. 18 illustrates an example of converting coordinates that are pointed out on the projection object into the coordinates of the actual image before recording the converted coordinates. An auxiliary marker image 90E is projected by a projection device in addition to marker images 90A through 90D at the four corners of a projection image. Accordingly, erroneous detections of the marker images 90A through 90D are prevented, and the precision in converting coordinates is improved (see, for example, patent document 1).

Patent Document 1: Japanese Laid-Open Patent Application No. 2008-225553

However, the above-described conventional technology has the following problem. Suppose that the projection device, the projection object, and the photographing device have been positioned, and the projection image area in which the projection image is projected has been detected based on a photographed image. However, if the relative positions of the projection device, the projection object, and the photographing device change due to some reason such as vibration, the detected projection image area may become irrelevant. Accordingly, an incorrect projection image area is recognized, unless the projection image area is detected once again by user operation (after the vibration).

DISCLOSURE OF INVENTION

The present invention has been made in view of the above-described problems, and it is an object of at least one embodiment of the present invention to provide a projection image area detecting device capable of detecting, from a photographed image, projection image area in which a projection image is projected, in accordance with the changes in the relative positions of a projection device, a projection object, and a photographing device.

According to one aspect of the present invention, a projection image area detecting device includes a projection image area detecting unit configured to detect marker image areas in a photographed image that is obtained by photographing a projection image area including a projection image, the marker image areas including marker images that are used for identifying four corners of the projection image area, wherein the projection image area detecting unit detects the marker image areas by identifying a color included in the marker image areas that continues to change as time passes.

According to one aspect of the present invention, a projection image area detecting system includes a projection device configured to project a projection image onto a projection object; a photographing device configured to obtain a photographed image by photographing a projection image area including the projection image projected onto the projection object; and a projection image area detecting device including a projection image area detecting unit configured to detect marker image areas in the photographed image that is obtained by the photographing device, to detect the projection image area including the projection image in the photographed image, the marker image areas including marker images that are used for identifying four corners of the projection image area, a marker image generating unit configured to generate the marker images including a specific area where a color changes as time passes, a marker image adding unit configured to add the marker images generated by the marker image generating unit to the projection image, and an image supplying unit configured to supply the projection image to which the marker images have been added, to the projection device, wherein the projection image area detecting unit detects the marker image areas in the photographed image by identifying the color included in the marker image areas that continues to change as time passes, to detect the projection image area in the photographed image.

According to one aspect of the present invention, a projection image area detecting method includes detecting marker image areas in a photographed image that is obtained by photographing a projection image area including a projection image, the marker image areas including marker images that are used for identifying four corners of the projection image area, wherein the detecting the marker image areas includes identifying a color included in the marker image areas that continues to change as time passes.

According to one embodiment of the present invention, a projection image area detecting device is provided, which is capable of detecting, from a photographed image, a projection image area in which a projection image is projected, in accordance with the changes in the relative positions of a projection device, a projection object, and a photographing device.

BRIEF DESCRIPTION OF DRAWINGS

FIG. 7A illustrates a triangular marker image and FIG. 7B illustrates a marker image having a distorted triangular shape;

BEST MODE FOR CARRYING OUT THE INVENTION

Embodiments of the present invention are described below with reference to the accompanying drawings.

Figure 1:
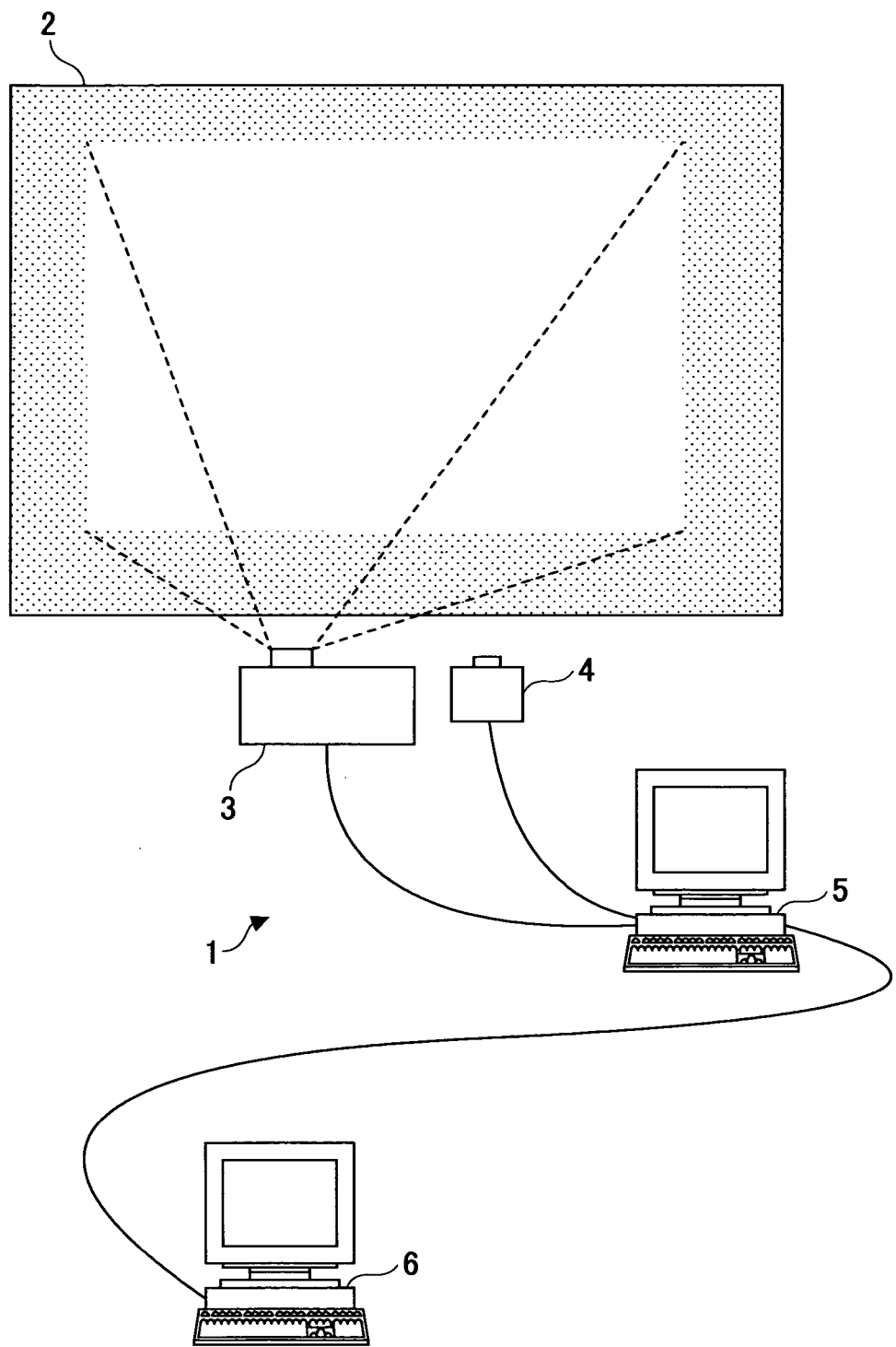
FIG. 1 illustrates a projection image area detecting system according to a first embodiment of the present invention.

FIG. 1 illustrates a projection image area detecting system 1 according to a first embodiment of the present invention. As shown in FIG. 1, the projection image area detecting system 1 includes a projection device 3 for projecting an image onto a whiteboard 2 acting as a projection object, a photographing device 4 for photographing an area including the image projected onto the whiteboard 2, and a projection image area detecting device 5 for detecting, from the photographed image, a projection image area in which the projection image is projected.

In the present embodiment, a whiteboard is applied as the projection object. However, the present invention is not so limited; a screen or paper may be applied as the projection object.

The projection device 3 may be a general-purpose projector. The projection device 3 projects an image that has been transmitted by the projection image area detecting device 5. The projection device 3 is positioned such that the projection range is included in the drawing area of the whiteboard 2.

The photographing device 4 may be a general-purpose camera. The photographing device 4 photographs an image displayed on the whiteboard 2 at time intervals set in advance, such as once every 0.5 seconds or 15 times a second. The photographing device 4 sends the photographed images to the projection image area detecting device 5. The photographing device 4 is positioned so that it can photograph the projection area of the projection device 3.

Figure 2:
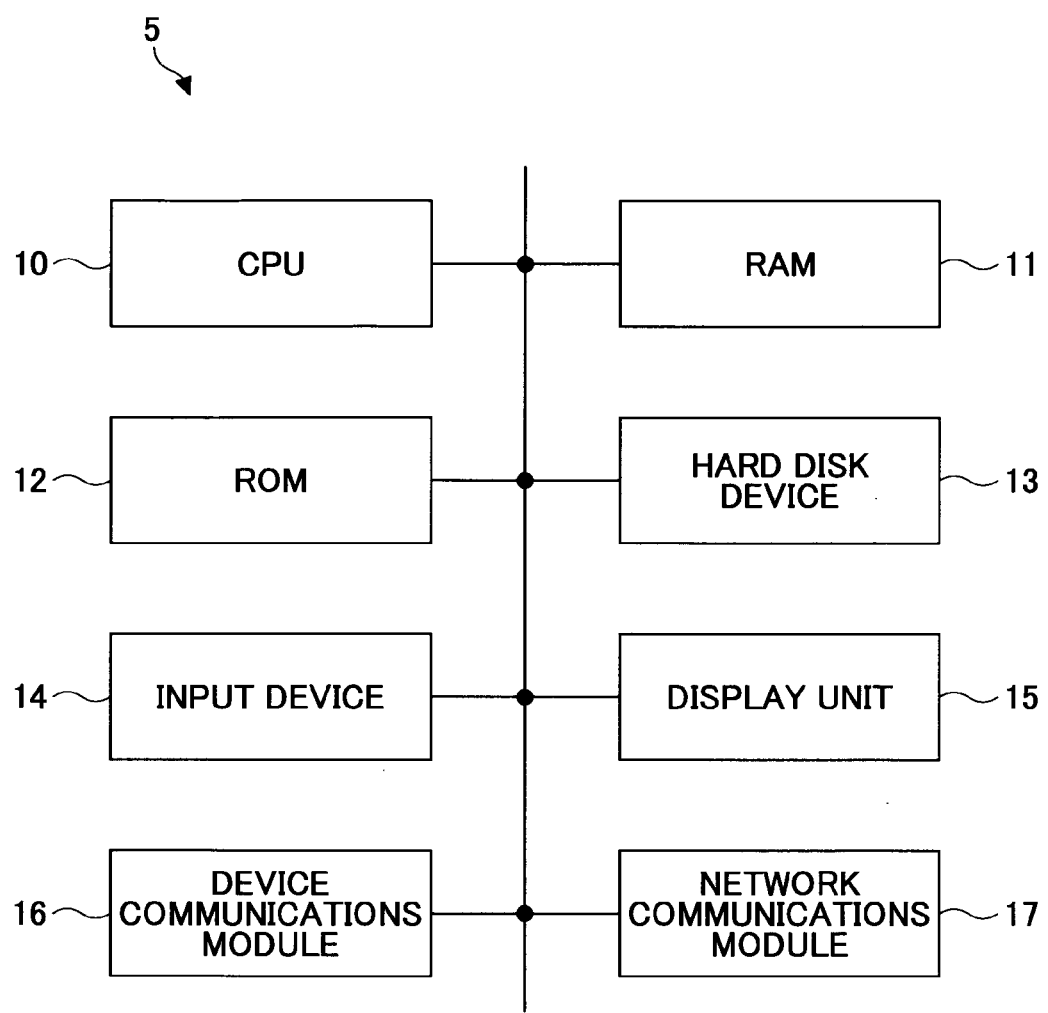
FIG. 2 illustrates a hardware configuration of a projection image area detecting device included in the projection image area detecting system according to the first embodiment of the present invention.

FIG. 2 illustrates a hardware configuration of the projection image area detecting device 5 included in the projection image area detecting system 1 according to the first embodiment of the present invention. As shown in FIG. 2, the projection image area detecting device 5 is a general-purpose computer including a CPU (Central Processing Unit) 10; a RAM (Random Access Memory) 11; a ROM (Read Only Memory) 12; a hard disk device 13; an input device 14 including a keyboard and a pointing device; a display unit 15 including a liquid crystal display; a device communications module 16 for communicating with external devices such as the projection device 3 and the photographing device 4; and a network communications module 17 for communicating with external devices connected via a network.

The ROM 12 and the hard disk device 13 store programs for causing the computer to function as the projection image area detecting device 5. That is to say, as the CPU 10 executes the programs stored in the ROM 12 and the hard disk device 13 by using the RAM 11 as a work area, the computer functions as the projection image area detecting device 5.

Figure 3:
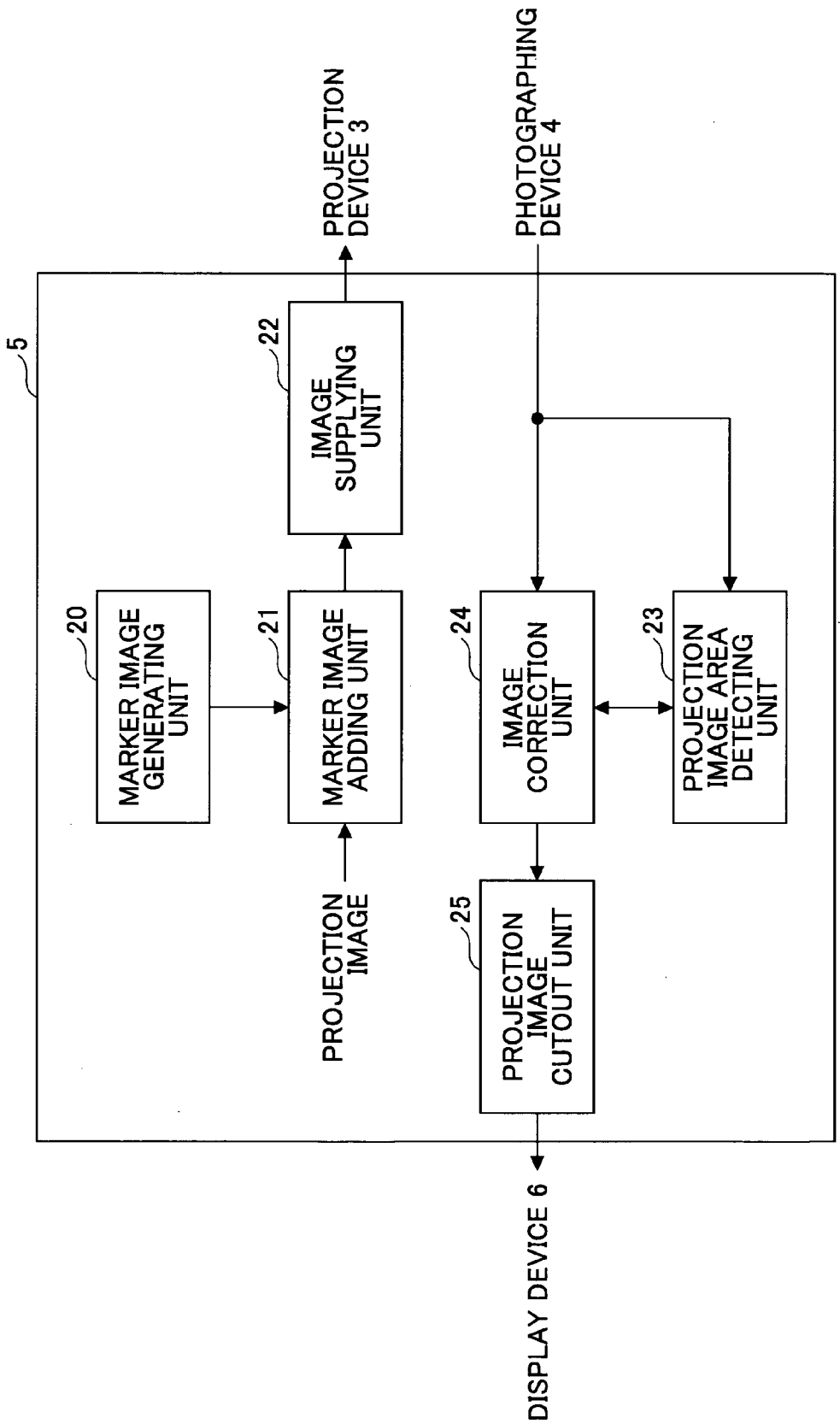
FIG. 3 is a functional block diagram of the projection image area detecting device included in the projection image area detecting system according to the first embodiment of the present invention.

FIG. 3 is a functional block diagram of the projection image area detecting device 5 included in the projection image area detecting system 1 according to the first embodiment of the present invention. As shown in FIG. 3, the projection image area detecting device 5 includes a marker image generating unit 20 for generating marker images for specifying the four corners of a projection image projected by the projection device 3; a marker image adding unit 21 for adding the marker images generated by the marker image generating unit 20 to the projection image; an image supplying unit 22 for supplying, to the projection device 3, the projection image to which the marker images have been added; a projection image area detecting unit 23 for detecting, from a photographed image that has been photographed by the photographing device 4, a projection image area in which the projection image is projected; an image correction unit 24 for correcting projection distortions in the photographed image based on the projection image area detected by the projection image area detecting unit 23; and a projection image cutout unit 25 for cutting out the projection image area in which the projection image is projected, from the photographed image that has been corrected by the image correction unit 24.

The marker image generating unit 20, the marker image adding unit 21, the projection image area detecting unit 23, the image correction unit 24, and the projection image cutout unit 25 are implemented by the CPU 10. The image supplying unit 22 is implemented by the device communications module 16.

In the present embodiment, the projection image corresponds to a display screen page of the display unit 15. However, the projection image may be an image created by an application such as presentation software that is executed by the computer functioning as the projection image area detecting device 5. The projection image may be an image that is received via the network communications module 17 from an external device such as another projection image area detecting device 5 at a remote location.

Figure 4:
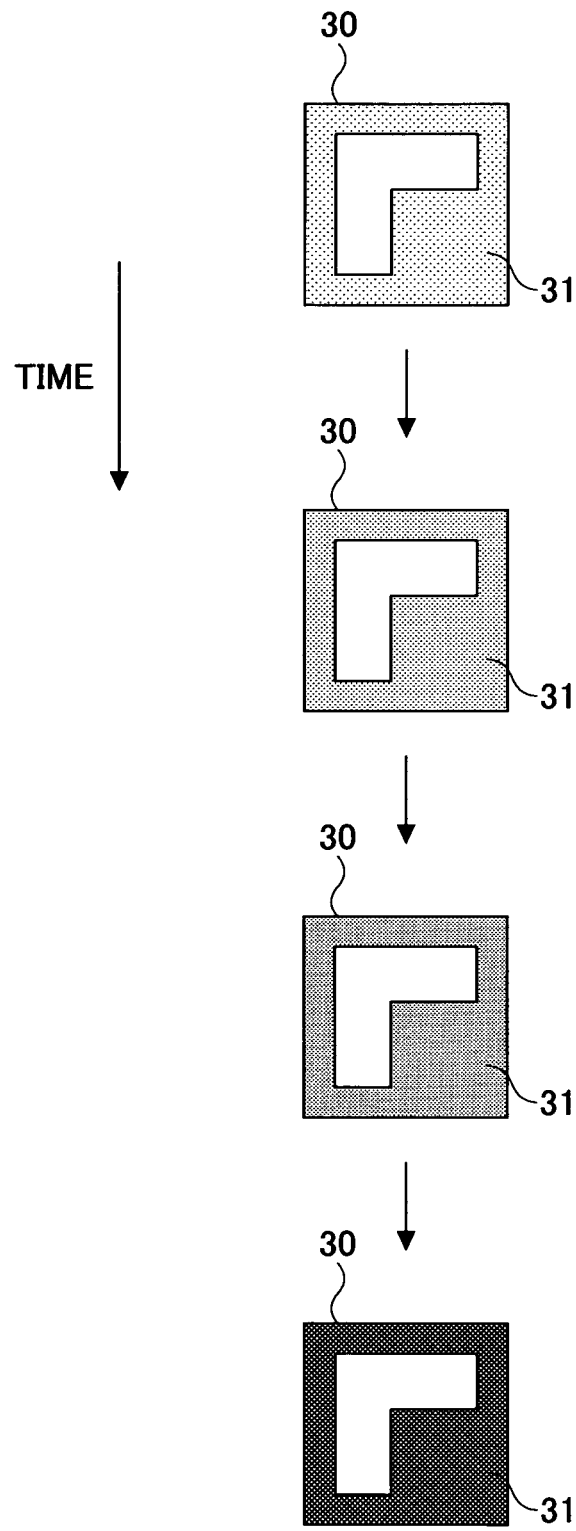
FIG. 4 is a concept diagram of an example of a marker image generated by a marker image generating unit of the projection image area detecting device according to the first embodiment of the present invention.

FIG. 4 is a concept diagram of a marker image generated by the marker image generating unit 20 of the projection image area detecting device 5 according to the first embodiment of the present invention. The marker image generating unit 20 generates, as a marker image 30, a marker whose color combination changes as time passes. In the example shown in FIG. 4, the color combination changes in a predetermined specific area 31 of the marker image 30 generated by the marker image generating unit 20. Specifically, the color components of R (red components), G (green components), and B (blue components) change as time passes as (255, 0, 0), (235, 20, 0), (215, 40, 0), and (195, 60, 0). In this manner, the red components decrease by 20 and the green components increase by 20 in every time frame.

When any of the color components in the specific area 31 becomes zero or more than 255, the marker image generating unit 20 changes the color combination of the specific area 31 to the initial combination (255, 0, 0).

The marker image generating unit 20 generates a marker image which has a simple pattern, and which does not have a periodic pattern, so that it can be identified in the photographed image. For example, marker images 40 and 41 shown in FIG. 5 are preferable marker images to be generated by the marker image generating unit 20.

Figure 5:
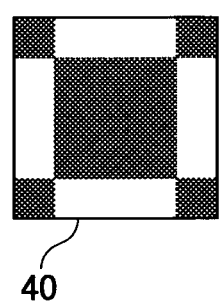
FIG. 5 are concept diagrams of other examples of marker images generated by the marker image generating unit of the projection image area detecting device according to the first embodiment of the present invention.
Figure 5:
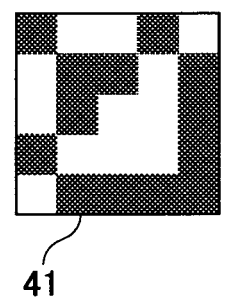
Figure 5:
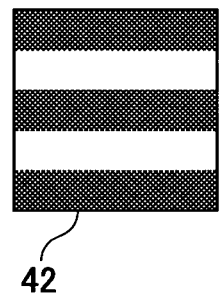
Figure 5:
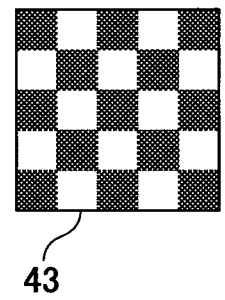

Meanwhile, marker images 42 and 43 shown in FIG. 5 have periodic patterns, and are thus not preferable marker images to be generated by the marker image generating unit 20. This is because if the period of the pattern coincides with the shift amount of the marker image projected in the photographed image, the projection image area detecting device 5 may erroneously detect that there is no shift in the marker image.

Figure 6:
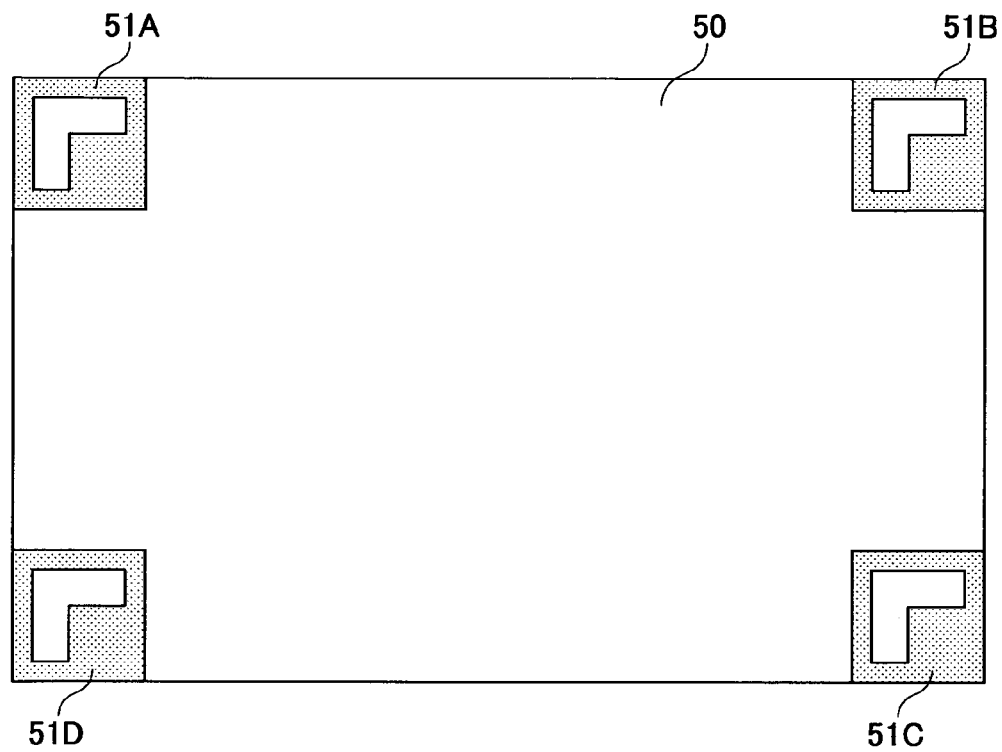
FIG. 6 is a concept diagram of an example of a projection image to which marker images are added by a marker image adding unit of the projection image area detecting device according to the first embodiment of the present invention.

Referring back to FIG. 3, the marker image adding unit 21 adds marker images 51A through 51D to the four corners of a projection image 50, as illustrated in FIG. 6. In FIG. 6, the marker images 51A through 51D have rectangular shapes as shown in FIG. 4; however, the marker image according to the present invention may have a shape other than a rectangle.

Figure 7A:
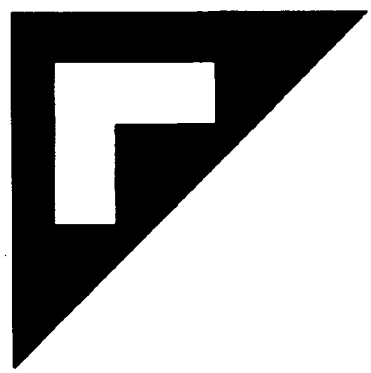
FIGS. 7A and 7B are concept diagrams of other examples of marker images generated by the marker image generating unit of the projection image area detecting device according to the first embodiment of the present invention, where
Figure 7B:
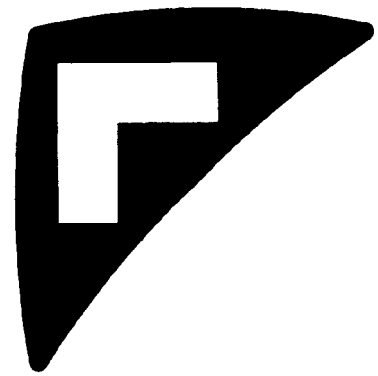

For example, the marker image may be a triangle as shown in FIG. 7A. Furthermore, as long as the marker image has a vertex corresponding to each of the four corners of the projection image, the marker image may have a distorted shape as shown in FIG. 7B. However, for the purpose of making it easy to identify the four corners of the projection image, the marker image is preferably a polygon such as a triangle or a square or a sector, having a vertex corresponding to each of the four corners of the projection image.

As shown in FIG. 6, each of the marker images 51A through 51D is positioned in contact with the inside of one of the four corners. However, the marker image adding unit 21 may add the marker images 51A through 51D to any position inside the projection image 50, as long as the four corners of the projection image 50 can be identified.

Furthermore, the marker images 51A through 51D shown in FIG. 6 are all the same; however, the marker image generating unit 20 may generate different images as the marker images 51A through 51D.

Referring back to FIG. 3, the image supplying unit 22 supplies an image to the projection device 3 so that the projection device 3 projects a projection image to which the marker images have been added.

The projection image area detecting unit 23 detects marker image areas in which the marker images are projected, from a photographed image that is photographed by the photographing device 4. Accordingly, the projection image area detecting unit 23 detects the projection image area in which the projection image is projected, from the photographed image.

When detecting the marker image areas, the projection image area detecting unit 23 uses two modes, i.e., an initial detection mode and a dynamic detection mode. The projection image area detecting unit 23 first uses the initial detection mode and then shifts to the dynamic detection mode.

In the initial detection mode, the projection image area detecting unit 23 scans two photographed images that have been taken at different times (for example, photographed images that have been continuously photographed in two time frames), and then generates a difference image between the photographed images that have been scanned.

Hereinafter, the time at which a photographed image has been photographed is expressed as t and coordinates of pixels are expressed as (x, y). Accordingly, the values of color components of pixels in a photographed image taken at a time t are expressed as R(t, x, y), G(t, x, y), and B(t, x, y).

Furthermore, difference values of color components of pixels between two photographed images taken at times t1 and t2 are expressed as |R(t1, x, y)−R(t2, x, y)|, |G(t1, x, y)−G(t2, x, y)|, and |B(t1, x, y)−B(t2, x, y)|.

Assuming that the difference values of color components of pixels between photographed images are |R(t1, x, y)−R(t2, x, y)|, |G(t1, x, y)−G(t2, x, y)|, and |B(t1, x, y)−B(t2, x, y)|, the projection image area detecting unit 23 generates a difference image in which pixels having difference values that satisfy a predetermined condition are valid colors (for example, black), and pixels having difference values that do not satisfy the predetermined condition are invalid colors (for example, white).

For example, difference values may be obtained for a specific color component (any one of R, G, or B, or a combination of R, G, and B; hereinafter, "specific color component"). The projection image area detecting unit 23 generates a difference image in which pixels having difference values that exceed a predetermined threshold TH are valid colors and other pixels are invalid colors.

In this case, the marker image generating unit 20 generates marker images having the following feature. That is, the specific color component in a specific area changes by an amount exceeding the threshold TH in every time frame, while the specific color component in areas other than the specific area changes by an amount that does not exceed the threshold TH in every time frame.

The projection image area detecting unit 23 may generate a difference image having the following feature. That is, the valid colors are formed by pixels having difference values corresponding to the specific color component that exceed a predetermined first threshold TH1, and pixels having difference values corresponding to colors other than the specific color component (hereinafter, "non-specific color component") that are lower than a predetermined second threshold TH2. Furthermore, the invalid colors are formed by pixels other than the above.

In this case, the marker image generating unit 20 generates marker images having the following feature. That is, in a specific area, the specific color component changes by an amount exceeding the first threshold TH1 in every time frame, while the non-specific color component changes by an amount that does not exceed the second threshold TH2 in every time frame. Furthermore, in areas other than the specific area, the specific color component changes by an amount that does not exceed the first threshold TH1 in every time frame, or the non-specific color component changes by an amount exceeding the second threshold TH2 in every time frame.

The projection image area detecting unit 23 may generate a difference image having the following feature. That is, first valid colors (for example, red) are formed by pixels having difference values corresponding to a first specific color component that exceed a predetermined third threshold TH3. Second valid colors (for example, blue) are formed by pixels having difference values corresponding to a second specific color component that exceed the predetermined third threshold TH3. Furthermore, the invalid colors (for example, white) are formed by pixels other than the above.

In this case, the marker image generating unit 20 generates marker images having the following feature. That is, in a first specific area, a first specific color component changes by an amount exceeding the third threshold TH3 in every time frame. In a second specific area, a second specific color component changes by an amount exceeding the third threshold TH3 in every time frame. In areas other than the first and second specific areas, the first specific color component or the second specific color component changes by an amount that does not exceed the third threshold TH3 in every time frame.

Figure 8:
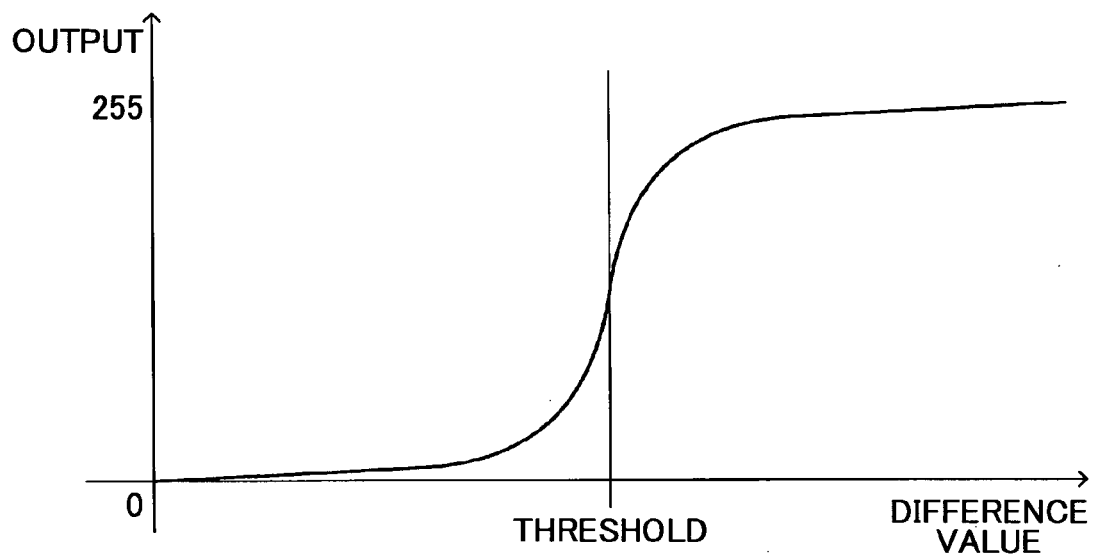
FIG. 8 illustrates a graph indicating an example of a function that is referred to when the projection image area detecting unit of the projection image area detecting device according to the first embodiment of the present invention generates a difference image.

The projection image area detecting unit 23 may generate a difference image by a method other than simply comparing the difference values of a specific color component with a threshold. That is, the projection image area detecting unit 23 may generate a difference image based on a value obtained by a function in which the tilt near the threshold is smooth, as shown in FIG. 8.

In the present embodiment, the projection image area detecting unit 23 generates a difference image in which pixels having difference values corresponding to the R component that exceed a threshold TH are a valid color (black), and other pixels are an invalid color (white).

When a difference image is generated, the projection image area detecting unit 23 extracts circumscribed rectangles of an area formed by black pixels. Among the extracted circumscribed rectangles, those having an area exceeding a predetermined upper limit value and those having an area that is less than a predetermined lower limit value are removed from the difference image. The upper limit value and the lower limit value are determined in advance according to the substantial area of the marker image area that is calculated based on the ratio of the area of the marker image to the projection image, and the area of the photographed image.

Figure 9:
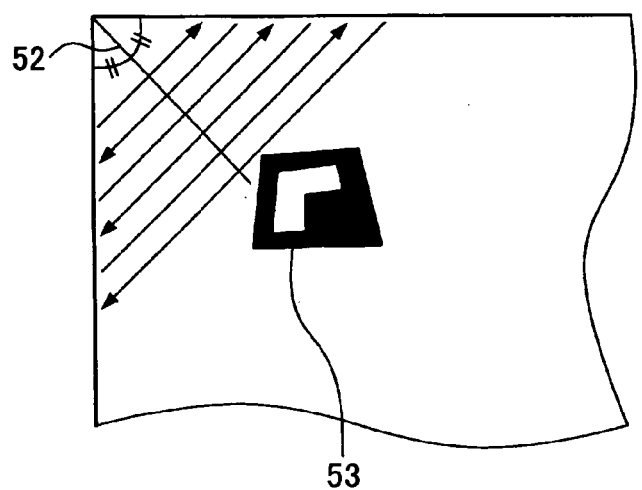
FIG. 9 is a concept diagram of an example of detecting a marker image area in a photographed image by the projection image area detecting unit of the projection image area detecting device according to the first embodiment of the present invention.

When corresponding circumscribed rectangles are removed, the projection image area detecting unit 23 detects the projection image area by detecting angles and lines of the marker images. For example, as shown in FIG. 9, the difference image is diagonally scanned by using a bisector 52 of each corner of the difference image as a sub-scanning direction, in order to detect a marker image area where each marker image 53 is projected. Based on the detected marker image areas, the projection image area is detected.

In the initial detection mode, the projection image area detecting unit 23 may perform corner detection using a Harris operator and polygon detection using edges. Accordingly, the projection image area detecting unit 23 can detect the corners of the marker image areas in which the marker images 53 are projected, and detect the projection image area based on the detected corners of marker image areas.

Referring back to FIG. 3, in the dynamic detection mode, the projection image area detecting unit 23 scans two photographed images that have been photographed at two different time points. Then, the image correction unit 24 corrects the projection distortions in the photographed images that have been scanned. The projection image area detecting unit 23 generates a difference image between the two corrected images, similar to the initial detection mode.

In the present embodiment, also in the dynamic detection mode, the projection image area detecting unit 23 generates a difference image in which pixels having difference values corresponding to the R component that exceed a threshold TH are a valid color (black), and other pixels are an invalid color (white).

Figure 10:
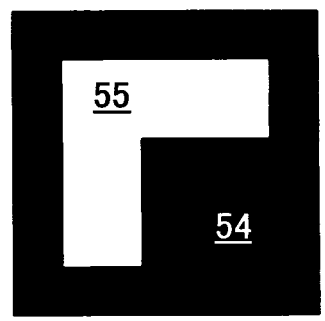
FIG. 10 is a concept diagram of an example of a template image used for template matching performed by the projection image area detecting unit of the projection image area detecting device according to the first embodiment of the present invention.

When the difference image is generated, the projection image area detecting unit 23 performs template matching on the difference image with the use of a predetermined template image. For example, as shown in FIG. 10, in the template image for each marker image, a specific area 54 has a valid color (for example, black) and areas 55 other than the specific area 54 have an invalid color (for example, white).

Before performing the template matching, the projection image area detecting unit 23 adjusts the template image to be the same size as the marker image area detected in the initial detection mode.

Figure 11:
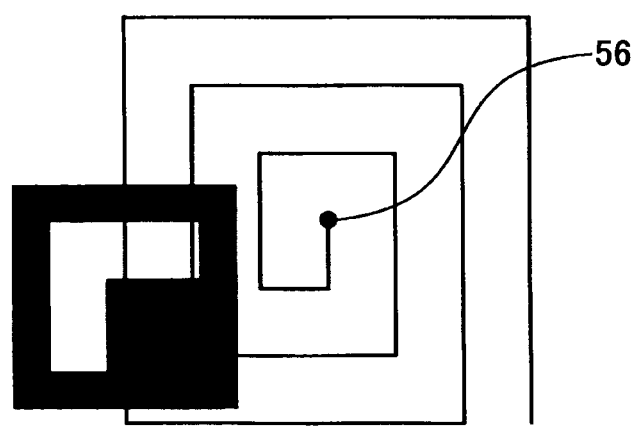
FIG. 11 is a concept diagram for describing template matching performed by the projection image area detecting unit of the projection image area detecting device according to the first embodiment of the present invention.

For example, as shown in FIG. 11, the projection image area detecting unit 23 performs the template matching on the marker image area by gradually moving the template image from a position 56. The position 56 is where the marker image area has been detected in the initial detection mode or where the marker image area has been previously detected in the dynamic detection mode (hereinafter, "detected marker image area"). After the template image has been moved by a predetermined amount, i.e., after a predetermined area has been searched, the projection image area detecting unit 23 determines the area of the template image having the highest correlation value to be the marker image area.

Referring back to FIG. 3, the image correction unit 24 calculates a coefficient for correcting the projection distortion of the projection image area detected by the projection image area detecting unit 23, for turning the projection image area into a rectangle. The image correction unit 24 uses the calculated coefficient to correct the projection distortion of the photographed image. Accordingly, the projection distortions of the marker images are also corrected, and therefore the precision in the template matching performed by the projection image area detecting unit 23 is also improved.

The projection image cutout unit 25 cuts out the projection image area from the photographed image that has been corrected by the image correction unit 24. In the present embodiment, the projection image area detecting device 5 sends the image that has been cut out by the projection image cutout unit 25 to a display device 6 (see FIG. 1) at a remote location via the network communications module 17, and causes the display device 6 to display the image.

The projection image area detecting device 5 may send the image that has been cut out by the projection image cutout unit 25 to an external device such as another projection image area detecting device 5 at a remote location, via the network communications module 17.

The projection image area detecting device 5 may send the image that has been cut out by the projection image cutout unit 25 to an external recording device via the network communications module 17, and cause the recording device to display the image. The projection image area detecting device 5 may record the image that has been cut out by the projection image cutout unit 25, in the hard disk device 13.

Operations of the above-described projection image area detecting device 5 are described with reference to FIGS. 12 through 14.

Figure 12:
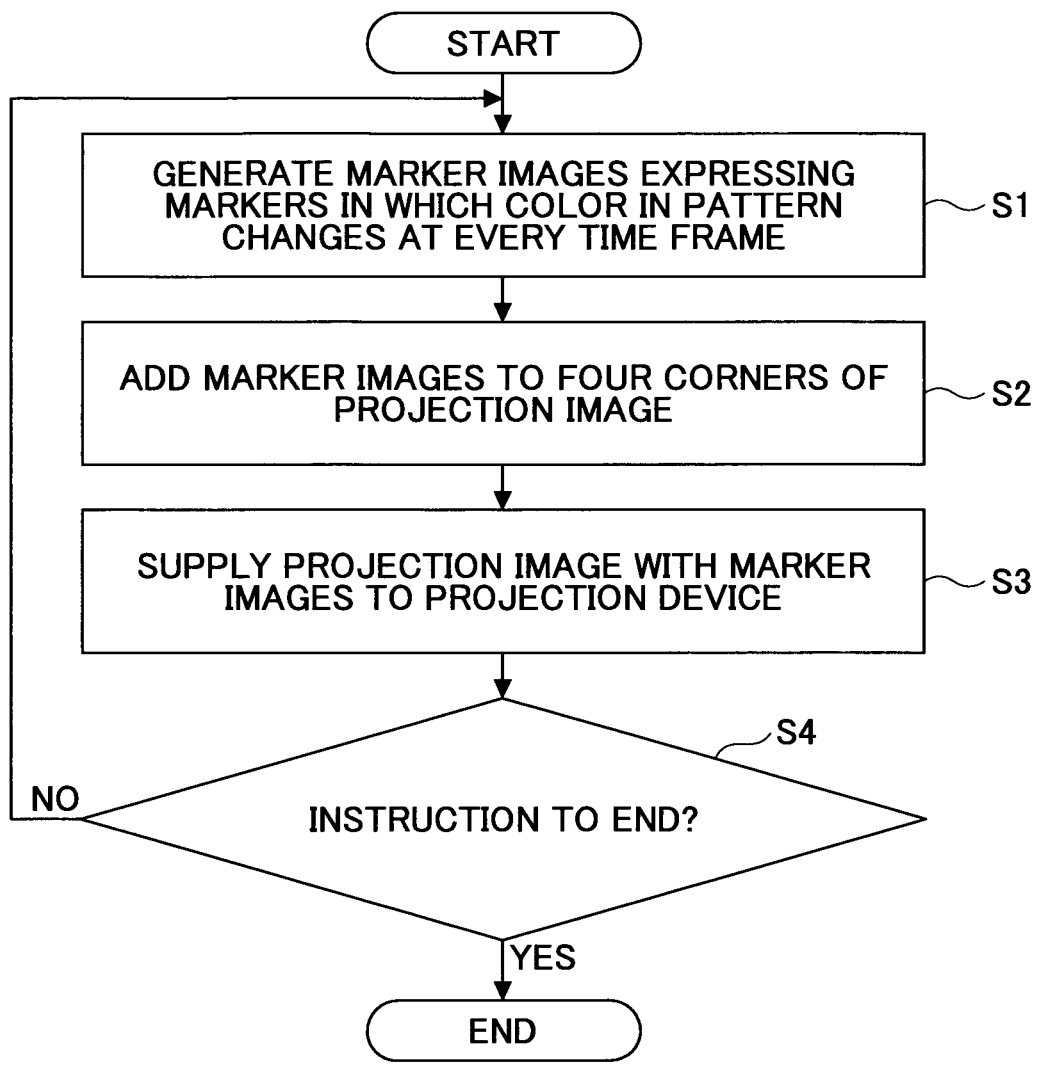
FIG. 12 is a flowchart for describing a projection image supplying operation performed by the projection image area detecting device according to the first embodiment of the present invention.

FIG. 12 is a flowchart for describing a projection image supplying operation performed by the projection image area detecting device 5. The projection image supplying operation described below is executed in accordance to an input operation of the input device 14.

First, the marker image generating unit 20 generates marker images expressing markers in which the color in the pattern changes at every time frame (step S1). Next, the marker image adding unit 21 adds the marker images generated by the marker image generating unit 20 to the four corners of the projection image representing the display screen page of the display unit 15 (step S2). The image supplying unit 22 supplies, to the projection device 3, the projection image to which the marker images have been added (step S3).

When an instruction to end the projection image supplying operation is given by an input operation of the input device 14, the projection image supplying operation is ended. When an instruction to end the projection image supplying operation is not given, the projection image supplying operation returns to step S1 (step S4).

Figure 13:
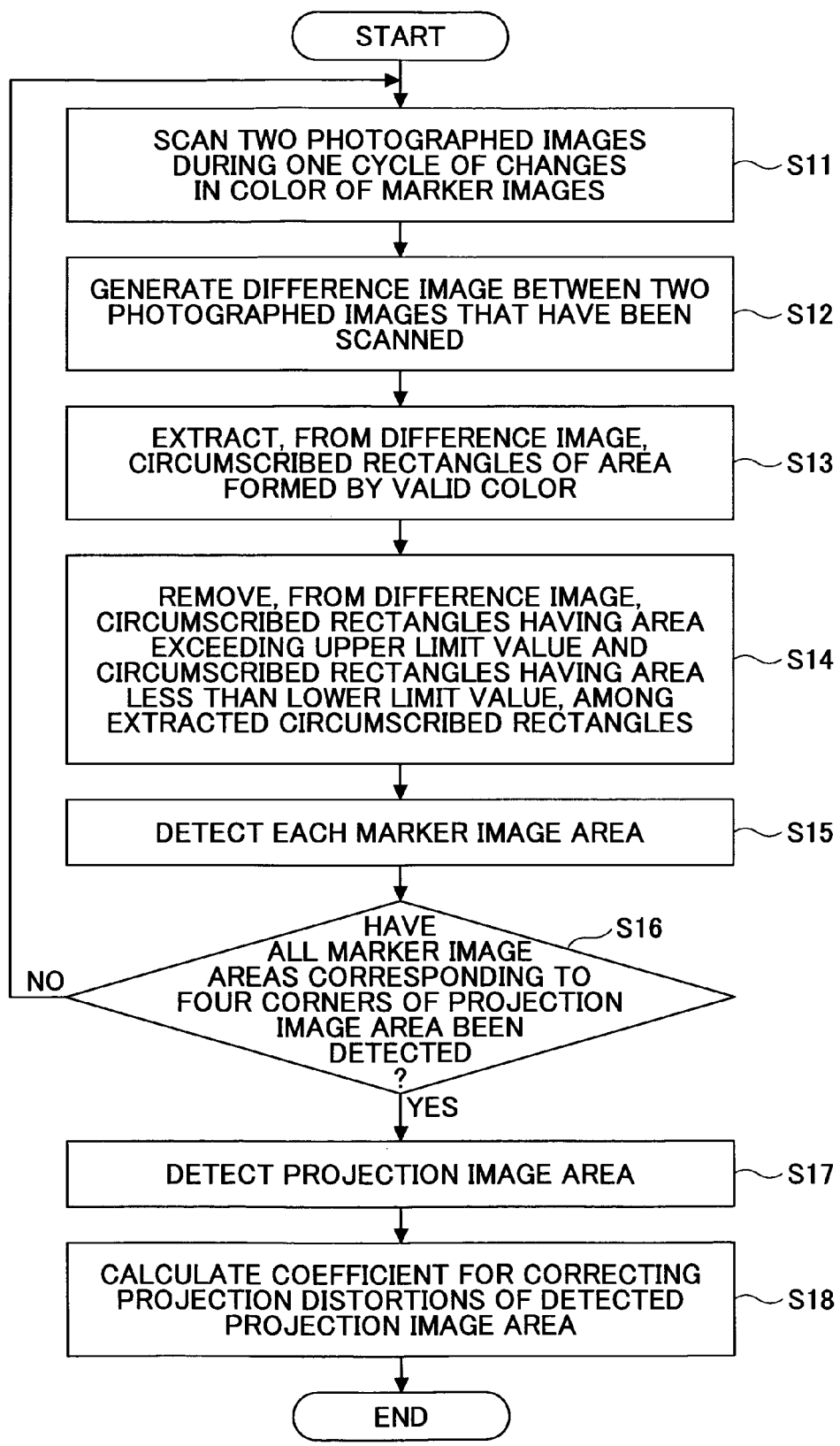
FIG. 13 is a flowchart for describing the correction coefficient calculating operation in the initial detection mode performed by the projection image area detecting device according to the first embodiment of the present invention.
Figure 14:
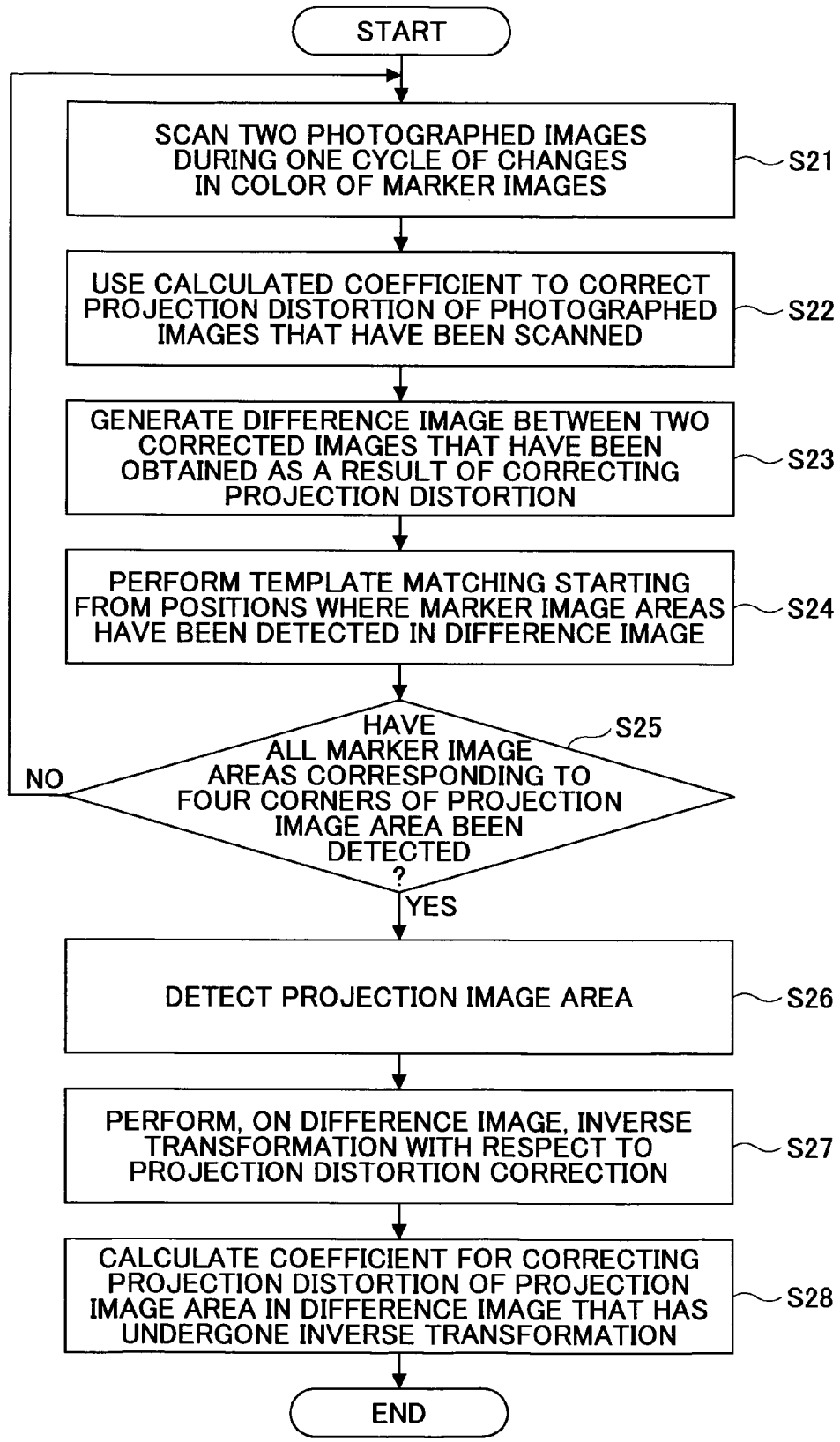
FIG. 14 is a flowchart for describing the correction coefficient calculating operation in the dynamic detection mode performed by the projection image area detecting device according to the first embodiment of the present invention.

FIGS. 13 and 14 are flowcharts for describing a correction coefficient calculating operation performed by the projection image area detecting device 5. FIG. 13 is a flowchart for describing the correction coefficient calculating operation performed by the projection image area detecting device 5 in the initial detection mode.

First, the projection image area detecting unit 23 scans two photographed images that have been photographed by the photographing device 4 during one cycle of changes in the color of the marker images generated by the marker image generating unit 20 (step S11).

Next, the projection image area detecting unit 23 generates a difference image between two photographed images that have been scanned (step S12). The projection image area detecting unit 23 extracts, from the difference image, circumscribed rectangles of an area formed by black pixels which is the valid color (step S13).

Next, the projection image area detecting unit 23 removes, from the difference image, circumscribed rectangles having an area exceeding a predetermined upper limit value and circumscribed rectangles having an area that is less than a predetermined lower limit value, among the extracted circumscribed rectangles (step S14). Next, the projection image area detecting unit 23 detects a marker image area where each marker image is projected by diagonally scanning the difference image by using a bisector of each corner of the difference image as a sub-scanning direction (step S15).

The projection image area detecting unit 23 determines whether all marker image areas corresponding to the four corners of the projection image area have been detected (step S16). When all marker image areas corresponding to the four corners of the projection image area have not yet been detected, the correction coefficient calculation operation returns to step S1.

Meanwhile, when all marker image areas corresponding to the four corners of the projection image area have been detected, the projection image area detecting unit 23 detects the projection image area based on the detected marker image areas (step S17). The image correction unit 24 calculates a coefficient for correcting projection distortions of the detected projection image area (step S18).

FIG. 14 is a flowchart for describing the correction coefficient calculating operation performed by the projection image area detecting device 5 in the dynamic detection mode. The correction coefficient calculating operation described below may be executed at predetermined time intervals or may be executed continuously.

First, the projection image area detecting unit 23 scans two photographed images that have been photographed by the photographing device 4 during one cycle of changes in the marker images generated by the marker image generating unit 20 (step S21).

Next, the image correction unit 24 uses the calculated coefficient to correct the projection distortion of the photographed images that have been scanned (step S22). The projection image area detecting unit 23 generates a difference image between two corrected images that have been obtained as a result of correcting the projection distortion (step S23).

Next, the projection image area detecting unit 23 performs template matching starting from positions where the marker image areas have been detected in the difference image, to detect the marker image areas (step S24).

The projection image area detecting unit 23 determines whether all marker image areas corresponding to the four corners of the projection image area have been detected (step S25). When all marker image areas corresponding to the four corners of the projection image area have not yet been detected, the correction coefficient calculation operation returns to step S21.

When all marker image areas corresponding to the four corners of the projection image area have been detected, the projection image area detecting unit 23 detects, the projection image area based on the detected marker image areas (step S26).

The image correction unit 24 performs, on the difference image, inverse transformation with respect to the projection distortion correction performed in step S22 (step S27). Then, the image correction unit 24 calculates a coefficient for correcting the projection distortion of the projection image area in the difference image that has undergone the inverse transformation (step S28).

As described above, in the correction coefficient calculating operation executed by the projection image area detecting device 5, the image correction unit 24 performs projection distortion correction on the photographed images photographed by the photographing device 4 based on the coefficient calculated in the initial detection mode or the dynamic detection mode. Then, the projection image cutout unit 25 cuts out the projection area from the corrected photographed image. Then, the cut out image is sent to the display device 6 at a remote location via the network communications module 17.

As described above, the projection image area detecting system 1 according to the first embodiment of the present invention causes the projection device 3 to project marker images in which the colors of patterns change as time passes. Accordingly, areas where the colors of patterns continue to change as time passes, are detected as marker image areas in the photographed image. Thus, even if there is a change in the relative positions of the projection device 3, the whiteboard 2, and the photographing device 4, the projection image area can be detected from the photographed image in accordance with the changes in the relative positions.

In the present embodiment, the marker image generating unit 20 generates the marker images 30 as shown in FIG. 4. However, the marker image generating unit 20 may be configured to generate a marker image for the dynamic detection mode having a smaller size than the marker image generated for the initial detection mode.

With such a configuration, the marker images in the dynamic detection mode are less prominent than the marker images in the initial detection mode, and therefore the visibility of the projection image can be improved.

In order to improve the visibility of the projection image, the marker image generating unit 20 may generate the marker images in the dynamic detection mode to have a lower contrast than that of the marker images in the initial detection mode.

In order to improve the visibility of the projection image, the marker image generating unit 20 may generate the marker images in the dynamic detection mode having a color that changes by a smaller amount than that of the marker images in the initial detection mode.

Figure 15:
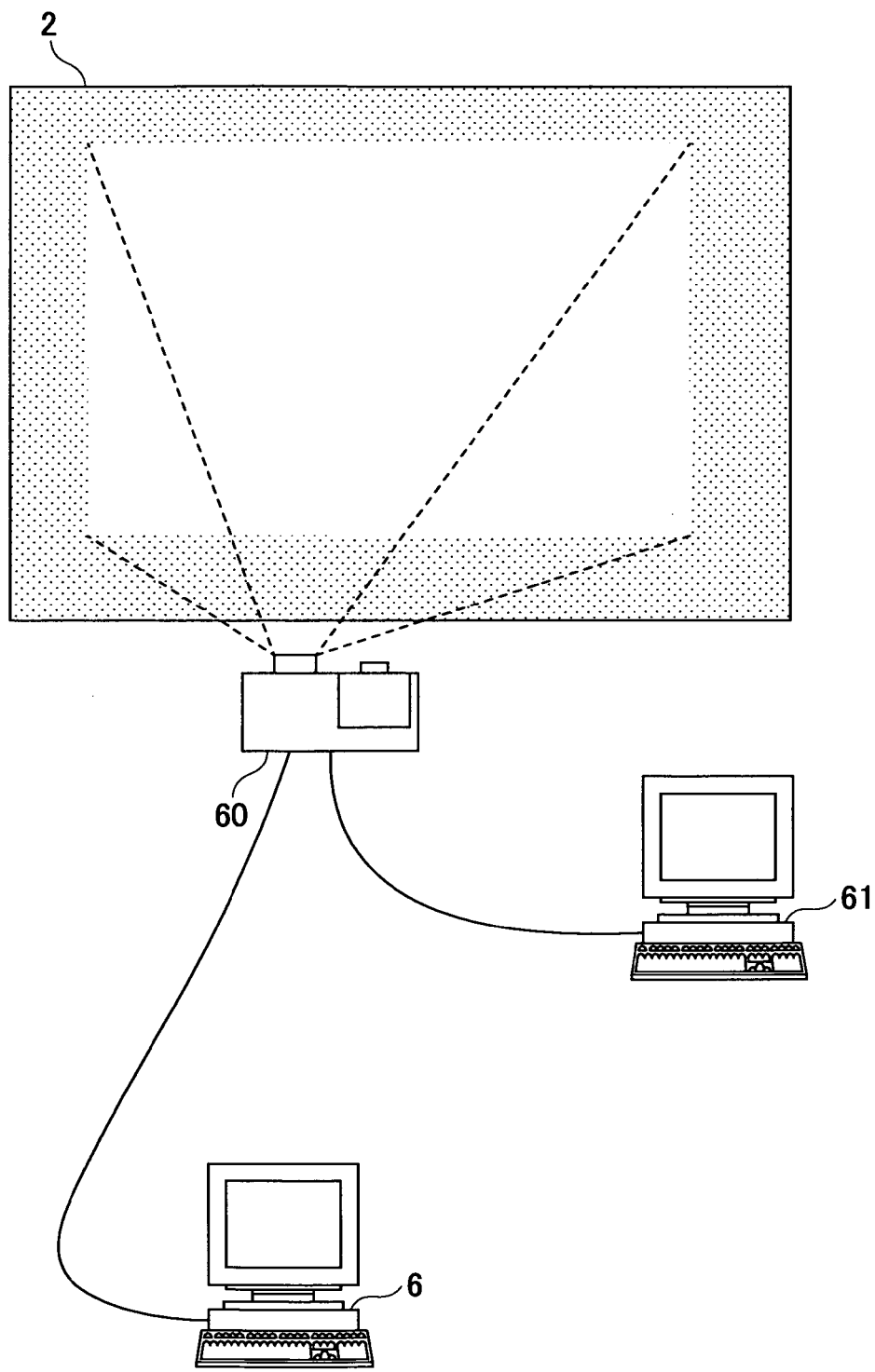
FIG. 15 illustrates a projection image area detecting system according to a second embodiment of the present invention.

FIG. 15 illustrates a projection image area detecting system according to a second embodiment of the present invention. As shown in FIG. 15, in a projection image area detecting device 60 according to the second embodiment, the projection device 3, the photographing device 4, and the projection image area detecting device 5 of the first embodiment are integrated in a single unit. In the second embodiment, elements corresponding to those of the first embodiment are denoted by the same reference and are not further described.

Figure 16:
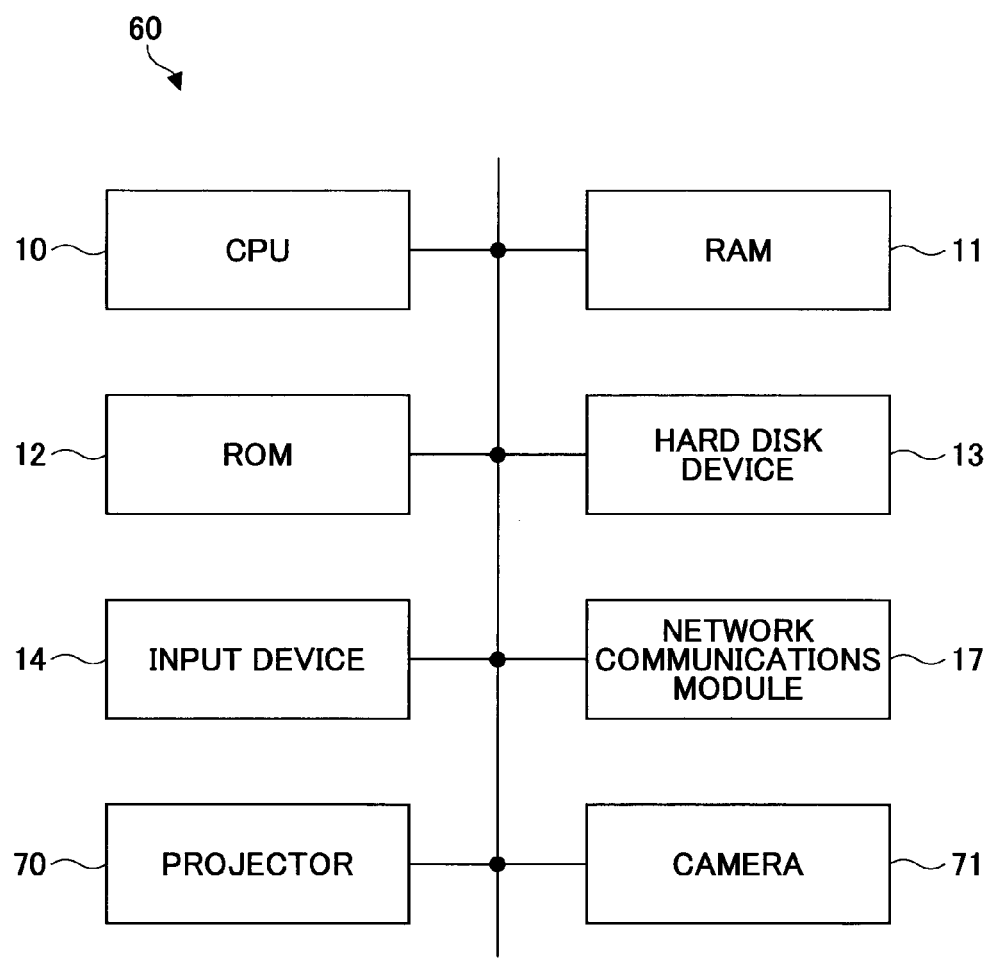
FIG. 16 illustrates a hardware configuration of a projection image area detecting device included in the projection image area detecting system according to the second embodiment of the present invention.

FIG. 16 illustrates a hardware configuration of the projection image area detecting device 60 included in the projection image area detecting system according to the second embodiment of the present invention. As shown in FIG. 16, the projection image area detecting device 60 includes the CPU 10, the RAM 11, the ROM 12, the hard disk device 13, the input device 14, the network communications module 17, a projector 70, and a camera 71.

The ROM 12 and the hard disk device 13 stores programs for causing the device to function as the projection image area detecting device 60. That is to say, as the CPU 10 executes the programs stored in the ROM 12 and the hard disk device 13 by using the RAM 11 as a work area, the device functions as the projection image area detecting device 60.

Figure 17:
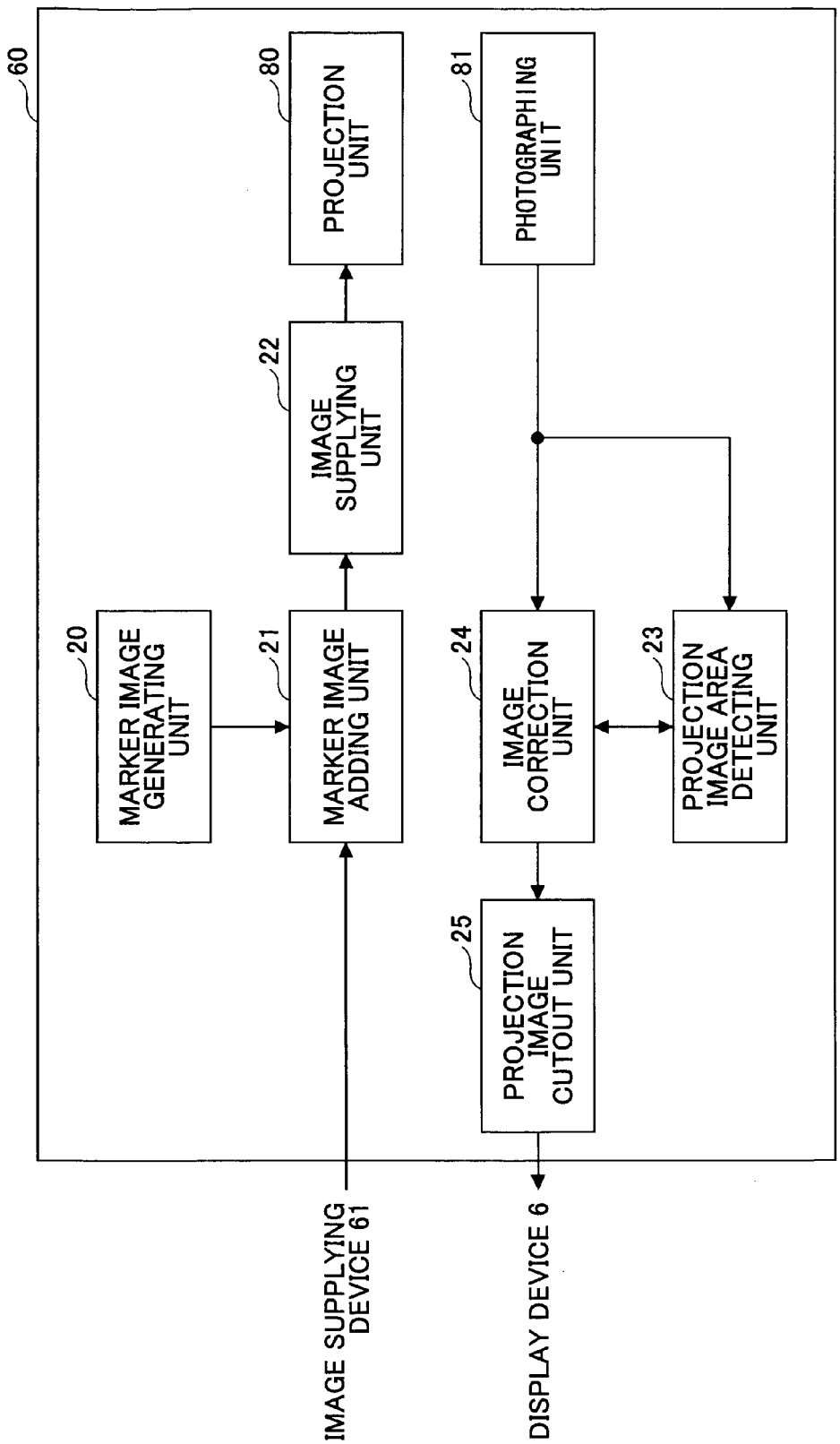
FIG. 17 is a functional block diagram of the projection image area detecting device included in the projection image area detecting system according to the second embodiment of the present invention.
Figure 18:
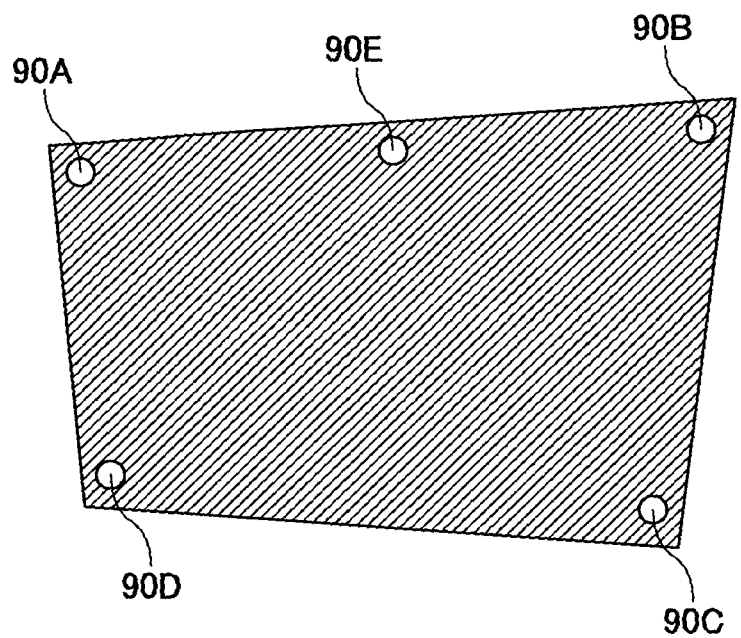
FIG. 18 illustrates an example of an image that is projected by a conventional projector system.

FIG. 17 is a functional block diagram of the projection image area detecting device 60 included in the projection image area detecting system according to the second embodiment of the present invention. As shown in FIG. 17, the projection image area detecting device 60 includes the marker image generating unit 20; the marker image adding unit 21; a projection unit 80 for projecting a projection image to which marker images have been added; a photographing unit 81 for photographing an area including the image projected onto the whiteboard 2; the projection image area detecting unit 23 for detecting, from a photographed image that has been photographed by the photographing unit 81, a projection image area in which the projection image is projected; the image correction unit 24; and the projection image cutout unit 25.

The marker image generating unit 20, the marker image adding unit 21, the projection image area detecting unit 23, the image correction unit 24, and the projection image cutout unit 25 are implemented by the CPU 10. The projection unit 80 is implemented by the projector 70. The photographing unit 81 is implemented by the camera 71.

In the present embodiment, the projection image is supplied to an image supplying device 61 that is connected to the projection image area detecting device 60. The image supplying device 61 is, for example, a general-purpose computer.

The projection image may correspond to a display screen page of the computer functioning as the image supplying device 61, or an image created by an application such as presentation software that is executed by the computer, or an image that is received from an external device.

The operations of the image supplying device 61 may be easily assumed based on the descriptions of the operations performed by the projection image area detecting device 5 according to the first embodiment of the present invention.

As described above, the projection image area detecting device 60 according to the second embodiment of the present invention causes the projection unit 80 to project marker images in which the colors of patterns change as time passes. Accordingly, areas where the colors of patterns continue to change as time passes, are detected as marker image areas in the photographed image. Thus, even if there is a change in the relative positions of the projection image area detecting device 60 and the whiteboard 2, the projection image area can be detected from the photographed image in accordance with the changes in the relative positions.

According to an aspect of the present invention, the projection image area detecting device detects the marker image areas in the photographed image by identifying a color included in the marker image areas that continues to change as time passes. Thus, even if there is a change in the relative positions of the projection device, the projection object, and the photographing device, the projection image area can be detected from the photographed image in accordance with the changes in the relative positions.

According to an aspect of the present invention, the marker images have simple patterns that are not periodic patterns. Thus, the projection image area detecting device is prevented from erroneously detecting that there is no shift in the marker image when the period of the pattern coincides with the shift amount of the marker image projected in the photographed image.

According to an aspect of the present invention, the projection image area detecting device changes a predetermined color component in a specific area in the marker image as time passes. Thus, the color changes in a manner that is not irritating to the user.

According to an aspect of the present invention, the projection image area detecting device uses a difference image between plural photographed images photographed by the photographing unit. Thus, the projection image area detecting device can detect marker images having pattern colors that change as time passes.

According to an aspect of the present invention, the projection image area detecting device can achieve photographed images in which projection distortions are corrected.

According to an aspect of the present invention, the projection image area detecting device performs template matching, by using a predetermined template image, on a difference image between plural of the photographed images. Thus, the marker image areas can be detected with high precision.

According to an aspect of the present invention, in the dynamic detection mode, the projection image area detecting unit detects the marker image areas by performing template matching on areas in and around the marker image areas that have been previously detected. Thus, the execution time of template matching performed by the projection image area detecting device can be reduced.

According to an aspect of the present invention, the projection image area detecting unit defines a size of the predetermined template image based on the marker image areas detected in the initial detection mode. Thus, the projection image area detecting device can perform the template matching in the dynamic detection mode by using a template image having an optimum size.

According to an aspect of the present invention, the marker image generating unit generates the marker images of the dynamic detection mode to be less conspicuous than the marker images of the initial detection mode. Thus, the visibility of the projection image can be improved.

The present invention is not limited to the specific embodiments described herein, and variations and modifications may be made without departing from the scope of the present invention.

The present application is based on Japanese Priority Applications No. 2009-209460 filed on Sep. 10, 2009 and No. 2010-166943 filed on Jul. 26, 2010 with the Japan Patent Office, the entire contents of which are hereby incorporated by reference.

The invention claimed is:

1. A projection image area detecting device comprising:
   a projection image area detecting unit configured to detect marker image areas in a photographed image that is obtained by photographing a projection image area including a projection image, the marker image areas including marker images that are used for identifying four corners of the projection image area; and
   a marker image generating unit configured to generate the marker images including a specific area where a color changes as time passes,
   wherein the projection image area detecting unit detects the marker image areas by identifying the color included in the marker image areas that continues to change as time passes, and
   wherein the marker image generating unit generates the marker images having simple patterns that are not periodic patterns, such that the marker images can be identified in the photographed image.

2. The projection image area detecting device according to claim 1, further comprising:
   a marker image adding unit configured to add the marker images generated by the marker image generating unit to the projection image; and
   an image supplying unit configured to supply the projection image to which the marker images have been added, to a projection device that projects the projection image onto a projection object.

3. The projection image area detecting device according to claim 1, a wherein the marker image generating unit is configured to generate the marker images including the specific area where a predetermined color component changes as time passes, and
   wherein the projection image area detecting unit detects the marker image areas in the photographed image by identifying the predetermined color component that continues to change as time passes.

4. The projection image area detecting device according to claim 1, wherein the projection image area detecting unit detects the marker image areas in a difference image between plural of the photographed images.

5. The projection image area detecting device according to claim 1, further comprising an image correction unit configured to detect the projection image area of the projection image in the photographed image based on the marker image areas detected by the projection image area detecting unit, and to correct a projection distortion in the detected projection image area.

6. The projection image area detecting device according to claim 1, further comprising an image correction unit configured to detect the projection image area of the projection image in the photographed image based on the marker image areas detected by the projection image area detecting unit, and to correct a projection distortion in the detected projection image area,
   wherein the projection image area detecting unit operates in an initial detection mode and a dynamic detection mode, wherein
      in the initial detection mode, the projection image area detecting unit detects the marker image areas by identifying outermost corners of the marker image areas, and
      in the dynamic detection mode, the projection image area detecting unit detects the marker image areas by performing template matching, by using a predetermined template image, on a difference image between plural of the photographed images including the projection image areas that have been corrected by the image correction unit.

7. The projection image area detecting device according to claim 1, further comprising an image correction unit configured to detect the projection image area of the projection image in the photographed image based on the marker image areas detected by the projection image area detecting unit, and to correct a projection distortion in the detected projection image area,
   wherein the projection image area detecting unit operates in an initial detection mode and a dynamic detection mode, wherein
      in the initial detection mode, the projection image area detecting unit detects the marker image areas by identifying outermost corners of the marker image areas, the marker image areas being identified by diagonally scanning the photographed image by using a bisector of each corner of the photographed image as a sub-scanning direction, and
      in the dynamic detection mode, the projection image area detecting unit detects the marker image areas by performing template matching, by using a predetermined template image, on a difference image between plural of the photographed images including the projection image areas that have been corrected by the image correction unit.

8. The projection image area detecting device according to claim 1, further comprising an image correction unit configured to detect the projection image area of the projection image in the photographed image based on the marker image areas detected by the projection image area detecting unit, and to correct a projection distortion in the detected projection image area,
   wherein the projection image area detecting unit operates in an initial detection mode and a dynamic detection mode, wherein
      in the initial detection mode, the projection image area detecting unit detects the marker image areas by identifying outermost corners of the marker image areas, and
      in the dynamic detection mode, the projection image area detecting unit detects the marker image areas by performing template matching, by using a predetermined template image, on areas in and around the marker image areas that have been previously detected in a difference image between plural of the photographed images including the projection image areas that have been corrected by the image correction unit.

9. The projection image area detecting device according to claim 1, further comprising an image correction unit configured to detect the projection image area of the projection image in the photographed image based on the marker image areas detected by the projection image area detecting unit, and to correct a projection distortion in the detected projection image area, wherein the projection image area detecting unit operates in an initial detection mode and a dynamic detection mode, wherein in the initial detection mode, the projection image area detecting unit detects the marker image areas by identifying outermost corners of the marker image areas, and in the dynamic detection mode, the projection image area detecting unit detects the marker image areas by performing template matching, by using a predetermined template image, on a difference image between plural of the photographed images including the projection image areas that have been corrected by the image correction unit, wherein the projection image area detecting unit defines a size of the predetermined template image based on the marker image areas detected in the initial detection mode.

10. The projection image area detecting device according to claim 1, further comprising an image correction unit configured to detect the projection image area of the projection image in the photographed image based on the marker image areas detected by the projection image area detecting unit, and to correct a projection distortion in the detected projection image area, wherein the marker image generating unit is configured to generate the marker images including the specific area where a predetermined color component changes as time passes, wherein the projection image area detecting unit operates in an initial detection mode and a dynamic detection mode, wherein in the initial detection mode, the projection image area detecting unit detects the marker image areas by identifying outermost corners of the marker image areas, and in the dynamic detection mode, the projection image area detecting unit detects the marker image areas by performing template matching, by using a predetermined template image, on a difference image between plural of the photographed images including the projection image areas that have been corrected by the image correction unit, and wherein the marker image generating unit generates the marker images of the dynamic detection mode to have a smaller size than the marker images of the initial detection mode.

11. The projection image area detecting device according to claim 1, further comprising an image correction unit configured to detect the projection image area of the projection image in the photographed image based on the marker image areas detected by the projection image area detecting unit, and to correct a projection distortion in the detected projection image area, wherein the marker image generating unit is configured to generate the marker images including the specific area where a predetermined color component changes as time passes, wherein the projection image area detecting unit operates in an initial detection mode and a dynamic detection mode, wherein in the initial detection mode, the projection image area detecting unit detects the marker image areas by identifying outermost corners of the marker image areas, and in the dynamic detection mode, the projection image area detecting unit detects the marker image areas by performing template matching, by using a predetermined template image, on a difference image between plural of the photographed images including the projection image areas that have been corrected by the image correction unit, and wherein the marker image generating unit generates the marker images of the dynamic detection mode to have a lower contrast than the marker images of the initial detection mode.

12. The projection image area detecting device according to claim 1, further comprising an image correction unit configured to detect the projection image area of the projection image in the photographed image based on the marker image areas detected by the projection image area detecting unit, and to correct a projection distortion in the detected projection image area wherein the marker image generating unit is configured to generate the marker images including the specific area where a predetermined color component changes as time passes, wherein the projection image area detecting unit operates in an initial detection mode and a dynamic detection mode, wherein in the initial detection mode, the projection image area detecting unit detects the marker image areas by identifying outermost corners of the marker image areas, and in the dynamic detection mode, the projection image area detecting unit detects the marker image areas by performing template matching, by using a predetermined template image, on a difference image between plural of the photographed images including the projection image areas that have been corrected by the image correction unit, and wherein the marker image generating unit generates the marker images of the dynamic detection mode in which the color changes by a smaller amount than the marker images of the initial detection mode.

13. A projection image area detecting system comprising:
a projection device configured to project a projection image onto a projection object;
a photographing device configured to obtain a photographed image by photographing a projection image area including the projection image projected onto the projection object; and
a projection image area detecting device including:
a projection image area detecting unit configured to detect marker image areas in the photographed image that is obtained by the photographing device, to detect the projection image area including the projection image in the photographed image, the marker image areas including marker images that are used for identifying four corners of the projection image area,
a marker image generating unit configured to generate the marker images including a specific area where a color changes as time passes,
a marker image adding unit configured to add the marker images generated by the marker image generating unit to the projection image, and an image supplying unit configured to supply the projection image to which the marker images have been added, to the projection device, wherein the projection image area detecting unit detects the projection image area in the photographed image by detecting the marker image areas in the photographed image by identifying the color included in the marker image areas that continues to change as time passes, and wherein the marker image generating unit generates the marker images having simple patterns that are not periodic patterns, such that the marker images can be identified in the photographed image.

14. A projection image area detecting method comprising:

generating marker images that are used for identifying four corners of a projection image area and included in marker image areas in a photographed image, the photographed image being obtained by photographing the projection image area including a projection image;

detecting the marker image areas in the photographed image, wherein the generating the marker images includes generating the marker images to have simple patterns that are not periodic patterns, and wherein the detecting the marker image areas includes identifying a color included in the marker image areas that continues to change as time passes.

* * * * *